US008849748B2

(12) United States Patent
Filliettaz, III

(10) Patent No.: US 8,849,748 B2
(45) Date of Patent: Sep. 30, 2014

(54) SYSTEM AND METHOD FOR TRACKING PROGRESS OF MEDIA PROCESSING JOBS

(75) Inventor: Charles Maurice Filliettaz, III, Cape Elizabeth, ME (US)

(73) Assignee: Post Pro Finance Co., Inc., Encino, CA (US)

( * ) Notice: Subject to any disclaimer, the term of this patent is extended or adjusted under 35 U.S.C. 154(b) by 163 days.

(21) Appl. No.: 13/108,794

(22) Filed: May 16, 2011

(65) Prior Publication Data

US 2012/0296928 A1 Nov. 22, 2012

(51) Int. Cl.
*G06F 17/00* (2006.01)
*G06Q 10/10* (2012.01)

(52) U.S. Cl.
CPC .................................. *G06Q 10/103* (2013.01)
USPC ........... 707/607; 707/608; 707/609; 707/687; 707/705; 707/790

(58) Field of Classification Search
USPC .................................................. 707/600–899
See application file for complete search history.

(56) References Cited

U.S. PATENT DOCUMENTS

| 5,987,229 | A | * | 11/1999 | Bender et al. | 358/1.15 |
| 6,128,642 | A | * | 10/2000 | Doraswamy et al. | 709/201 |
| 6,466,935 | B1 | * | 10/2002 | Stuart | 707/999.01 |
| 6,557,089 | B1 | * | 4/2003 | Reed et al. | 711/162 |
| 6,694,345 | B1 | * | 2/2004 | Brelsford et al. | 718/100 |
| 7,032,186 | B1 | * | 4/2006 | Gasser et al. | 715/853 |
| 7,499,867 | B2 | * | 3/2009 | Lahey et al. | 705/7.13 |
| 2002/0023122 | A1 | * | 2/2002 | Polizzi et al. | 709/202 |
| 2005/0055520 | A1 | * | 3/2005 | Kappler | 711/162 |
| 2006/0017969 | A1 | * | 1/2006 | Ly et al. | 358/1.15 |
| 2007/0130233 | A1 | * | 6/2007 | Christensen | 707/204 |
| 2009/0313585 | A1 | * | 12/2009 | Hellinger et al. | 715/850 |

* cited by examiner

*Primary Examiner* — Isaac M Woo
(74) *Attorney, Agent, or Firm* — Novak Druce Connolly Bove + Quigg LLP

(57) ABSTRACT

Disclosed herein are systems, methods, and non-transitory computer-readable storage media for tracking progress of media processing jobs. A system tracking progress of media processing jobs receives a media processing job submitted by a user via an electronic portal, inserts the media processing job as a job entry in a job submission table, sets an initial status for the job entry, processes the media according to parameters associated with the media processing job, maintains a processing history of the media processing job, and updates the initial status based on the processing. The system displays processing history of media processing jobs through an application interface and allows a user to expand and collapse the history to display additional or fewer details of the processing, respectively. The system can generate a virtual representation of a received physical copy of the media and associate the virtual representation with the electronically submitted media processing job.

18 Claims, 9 Drawing Sheets

FIG. 3

| +ADD PO | EXPORT CSV | PO DATE ▽ | TITLE ▽ | DUE DATE ▽ | PO # ▽ | REF # ▽ | UPDATE | SEARCH | − ☐ X |
|---|---|---|---|---|---|---|---|---|---|
| ✏ 🗂 | | | Akeelah and the Bee<br>Due Date: 7/30/2010<br>7/14/2010  04:03:26 PM   PO DATA UPDATED USER: chuck@2gdigital.com<br>7/09/2010  11:47:14 PM   PO DATA UPDATED USER: chuck@2gdigital.com<br>7/09/2010  10:59:16 AM   Downloaded File PO BB2718ZG<br>7/08/2010  06:41:05 PM   Downloaded File PO BB2718GG<br><br>PO# 662718                         Client email: ari.wolfe@2gdigital.com<br>Client Ref # 10353834        Date: 07/08/2010 12:56:55 PM  — 320 | | | | | | |
| ✏ 🗂 | | | Pocahontas<br>07/14/2010  04:03:27 PM   PO DATA UPDATED | | | | | | |
| ✏ 🗂 | | | Underdog<br>07/14/2010  04:03:58 PM   PO DATA UPDATED | | | | | | |

330 (search box reference)
310 (Akeelah row reference)

FIG. 4

MESSAGE FOR AKEELAH AND THE BEE

TO:
CC:
SUBJECT: Akeelah and the Bee - PO 662718
MESSAGE:

SEND

FIG. 5

ADD PURCHASE ORDER

TITLE*
DESCRIPTION*

DUE DATE*   PO#*

CLIENT REF#
CLIENT EMAIL
CC EMAIL

SCHEDULER* SELECT A SCHEDULER ▽   AMOUNT

PURCHASE ORDER*

BROWSE .....

FIG. 6

```
              EDITING MOBSTERS

TITLE:  [ MOBSTERS              ]
DESCRIPTION:  [ ARCHIVAL              ]
              [ PROTECTION            ]
              [ J2K                   ]

CLIENT REF# [ 14320                 ]

PURCHASE ORDER*
610 ─        [              ] [ BROWSE ..... ]

[ SAVE PO CHANGES ]
```

SYSTEM AND METHOD FOR TRACKING PROGRESS OF MEDIA PROCESSING JOBS

BACKGROUND

1. Technical Field

The present disclosure relates to media processing and more specifically to tracking progress of media processing jobs.

2. Introduction

Digital media is an important aspect of our society today. Digital media store data in a digital format. Digital media can include memory in cellular phones and other mobile devices, compact discs, DVDs, computer hard drives, game consoles, etc. Such digital media can store video, audio, images, speech and text. Examples of digital formats are QuickTime, MPEG1, MPEG2, AVI, Windows Media, AC-3 audio, Layer II Audio, Windows Media Video, JPG, GIF, and BMP amongst others. Different digital devices require the digital conversion of media due to target devices not supporting specific formats or due to limited storage capacity of target devices requiring a reduced file size. In some situations, media are converted to a better-supported format.

Media processing companies accept orders from clients to convert media to a desired format. Often clients have numerous outstanding processing orders to track. Typically, a user submits a media processing order via fax, phone, or email, and any updates or problems are handled over the phone, requiring time-consuming person-to-person interaction when submitting an order and when correcting or tracking submitted orders. Tracking numerous processing orders simultaneously is a cumbersome, inefficient, and potentially confusing process.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for tracking progress of media processing jobs and/or other items enumerated in a list for processing. A system practicing the method receives a media processing job submitted by a user via an electronic portal and inserts the media processing job as a job entry in a job submission table. The system sets an initial status for the job entry and processes a digitally received media asset and/or a separately received physical media asset according to parameters associated with the media processing job. Then the system maintains a processing history of the media processing job, and updates the initial status based on the processing.

The system can display processing history of media processing jobs through an application interface. The user can expand and collapse the history to display additional or fewer details of the processing, respectively, such as by clicking on a "spring-loaded" menu item. The system can expand the menu items based on a current user context. For example, if the user is at a screen describing video post-processing effects, the system can dynamically modify the information found in the expanded spring-loaded item to display information relevant to video post-processing effects. The menu items can represent actual items, processing jobs, sub-steps of a process, and/or other items. The processing history can include information such as email correspondence between the user and the media processor, email attachments, media modifications, status updates and uploaded information. The system updates a media processing job by identifying email correspondence associated with the media processing job and incorporates at least part of the email correspondence in a processing history of the media processing job. The processing history is sorted using job submission date, job title, job due date, processing order number, reference number and updates and may include complete jobs or both complete and incomplete jobs when sorting the processing history. Additionally, the system can search the processing history by receiving a search query, searching the processing history based on the search query to produce search results, and displaying at least part of the search results.

Prior to entering a job entry into the job submission table, the system can authenticate a user and receive a user profile associated with the user. The user profile can contain a user image. The user profile can be associated with the user's job entries in the job submission table.

The system can receive a physical copy of media associated with an electronically submitted media processing job and generate a virtual representation of the physical copy of the media. Then the system can associate the virtual representation with the electronically submitted media processing job. The virtual representation can be, for example, an image and/or a three-dimensional model.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates displaying media processing history through an application interface;

FIG. 4 illustrates an email application interface;

FIG. 5 illustrates an application interface for receiving a media processing order;

FIG. 6 illustrates an application interface for editing an existing media processing job;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for tracking progress of media processing jobs. A system, method and non-transitory computer-readable media are disclosed which track progress of media processing jobs. A brief introductory description of a basic general purpose system or computing device in FIG. 1 which can be employed to practice the concepts is disclosed herein. A more detailed description of tracking progress of media processing jobs will then follow. These variations shall be discussed herein as the various embodiments are set forth. The disclosure now turns to FIG. 1.

Figure 1:
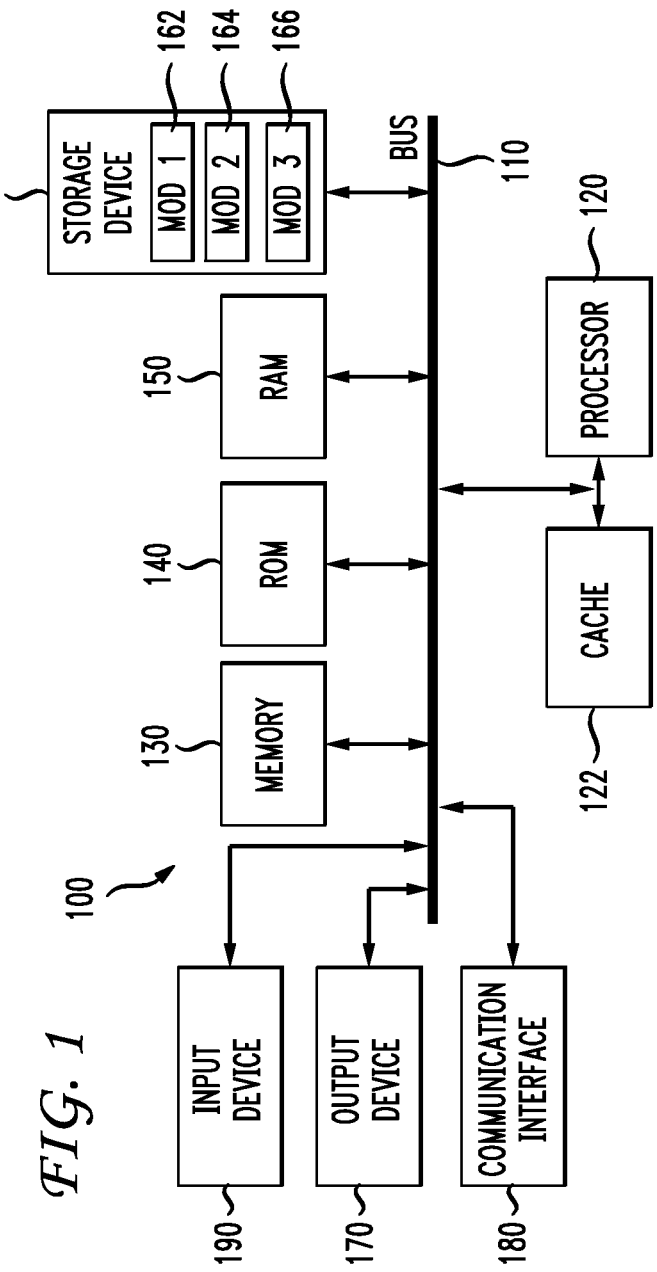
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
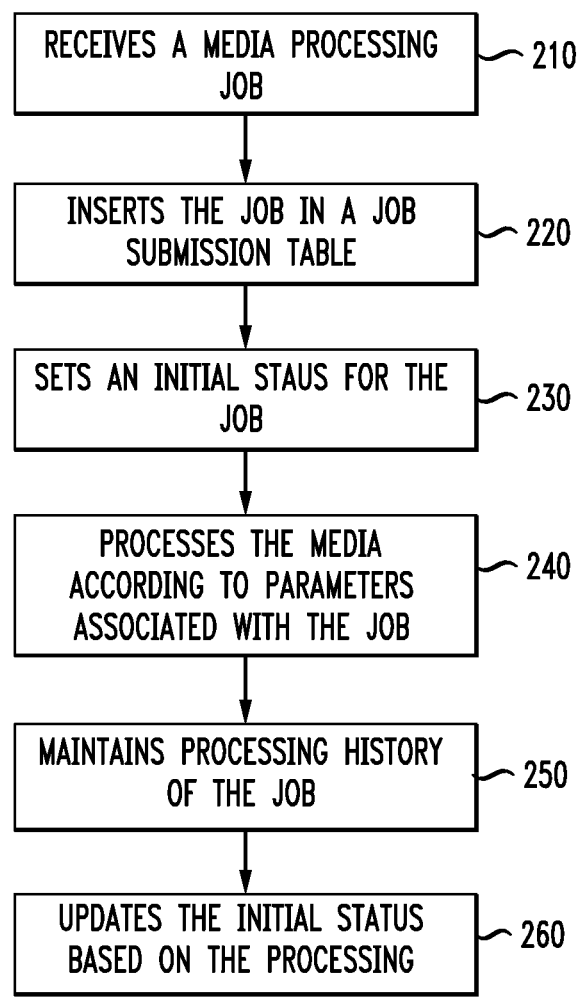
FIG. 2 illustrates an exemplary media processing method embodiment.

Having disclosed some basic system components and concepts, the disclosure now returns to a discussion of processing media jobs, and more specifically to the exemplary method embodiment shown in FIG. 2. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

FIG. 2 illustrates tracking progress of media processing jobs. A system 100 practicing the method receives a media processing job submitted by a user via an electronic portal (210) such as a website, file transfer protocol server, or other network-enabled software package, and inserts the media processing job as a job entry in a job submission table (220). The system 100 sets an initial status for the job entry (230). The system 100 can receive the media via electronic submission, i.e. the user uploads, streams, or sends a link to a media file, or the system 100 can receive a physical media asset, such as a DVD, cassette tape, solid-state drive, or other media storage device, via a courier or mail. Then the system 100 can process the electronic or physical media asset according to parameters associated with the media processing job (240). The system 100 maintains a processing history of the media processing job (250) and updates the initial status based on the processing (260). For example, a user has a video in audio video interleaved (AVI) format that he wants to play on his Apple iPod™. AVI format is a computer graphics animation format used in Microsoft Video for Windows. In order to play the video on his iPod the user must convert it to a compatible format such as MPEG4. The user submits a media processing job via an application interface such as a website to convert the AVI video to MPEG4 format. As another example, a producer shoots a 63-second commercial in AVCHD at 1080 p. The producer can submit an SD card containing the AVCHD files for the video and submit a media processing job for that SD card. The media processing job can indicate multiple desired versions of the commercial and can indicate a desired sound track for each. The media processing job can instruct the system to create a 30-second 720 p cut of the commercial, a 45-second 1080 i cut of the commercial, and a 60-second standard definition NTSC cut of the commercial. Then the system can track the progress of each portion of the media processing job based on the SD card as a single received physical media asset.

The system 100 receives the media processing job and inserts the job as a job entry in a job submission table. The system 100 sets the initial status as incomplete and converts the video to MPEG4 format. The system 100 updates the processing history as progress is made, and sets the status as complete when the job is finished.

The system 100 displays processing history of media processing jobs through the application interface. FIG. 3 illustrates an example user interface for displaying a media processing history. A user may expand and collapse media processing history to display additional 310 or fewer 320 details of the processing, respectively. For example, the application interface displays all details of the job entry titled "Akeelah and the Bee" 310 but displays few details of the job entry titled "Pocahontas" 320. The user may opt to collapse the details for "Akeelah and the Bee" or expand the processing history to show additional details about the "Pocahontas" job entry. By expanding or collapsing the processing history, the user can view only the most relevant information without filtering through extraneous data. Additionally, the system can display headlines and notifications as part of the application interface, such as when notifications relating to system maintenance or new application features.

The media processing history can include email correspondence between the user and the media processor, email attachments, media modifications, status updates, and/or uploaded information. The system 100 updates a media processing job by identifying email correspondence associated with the media processing job and incorporating at least part of the email correspondence in the processing history. A user can email a media processor directly through the media processing application interface without leaving the application to communicate with the media processor. FIG. 4 illustrates an application interface that allows a user to communicate with the media processor through email. A user can select the option to email the media processor from the processing history and the system 100 can automatically enter the title of the relevant media processing job, "Akeelah and the Bee" in the subject line of the email, or fill in any additional available information. Allowing email directly through the application interface facilitates communication between the media processor and the user and allows the job history to incorporate an entire correspondence history as well as job completion tasks. In this way, both the user and a human supervisor over the submitted job can quickly grasp a comprehensive picture of each and every interaction between the user, the job submission system, and any other individuals. In addition to email, the processing history can store email attachments, such as updated processing instructions. The processing history can include media modifications such as updated versions of the media and/or other uploaded information. The system 100 allows users to upload files of any size (including media proxies), such as spreadsheets, metadata, closed caption files, documents, PDFs, etc. Additionally, the media processing system can issue job status updates through the history. For example, in the processing history for "Akeelah and the Bee", the system can issue several updates indicating that files were downloaded from the application interface and that a user updated the processing order 310. Displaying processing history allows the user to track media processing job progress in an uncomplicated, straightforward, and unified manner.

The media processing system accepts media purchase orders through the application interface. A media purchase order contains the details for a media processing job such as title, media description, due date, user name, client reference number, email address, phone number, and scheduler. FIG. 5 illustrates an application interface for receiving a media processing order from a user. In one variation, the media processing order contains instructions and details on how to complete a project for a piece of physical media delivered separately from the media processing order. For example, a user can submit a media processing order online or via a network-enabled application on a desktop computer or smartphone, and at a separate time submit the actual physical media via courier, FedEx, or United States Postal Service. The instructions and details can indicate which piece of physical media to use as the source material and/or related materials, a due date for the project, specifications for the final product (including mandatory and/or desired specifications), spending limits, and so forth. Once the user enters relevant media job submission data, the user uploads a purchase order to the media processing system. The system 100 adds the purchase order to the existing media processing job 310 or creates a new job entry if one does not already exist. Also, a user can download or forward the media processing history associated with a media processing job entry for their own records.

In addition to adding a purchase order to a media processing job, a user may edit a media processing job directly through the media processing application interface. FIG. 6 illustrates an application interface for editing an existing media processing job. The user enters relevant information pertaining to the media job such as title, description, client reference number and purchase order. The system updates the media processing history by adding an entry with the updated information. For example, if a user wanted to edit the media processing job titled "Mobsters", the user enters the title, a description of the job, and the client reference number into the application interface and upload a new purchase order to the application 610.

Figure 7:
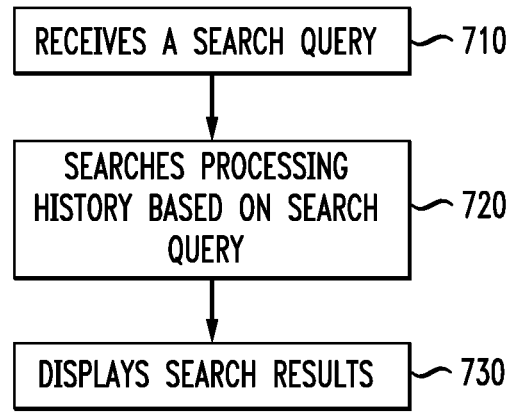
FIG. 7 illustrates an exemplary media processing history search method embodiment.

In one aspect, users can search and sort the media processing history through the application interface. FIG. 7 illustrates a block diagram logic flow for searching the media processing history. The system receives a search query (710) and searches the processing history based on the search query (720). Then the system displays the search results (730). For example, if a user wants to find all job entries updated by a specific media processor the user would enter the media processor's username in the search bar. The system 100 searches the processing history based on the media processor's username and displays all job entries associated with the media processor.

A user may sort the media processing history in various ways and based on one or more criteria. The processing history is sorted based on job submission date, job title, job due date, processing order number, reference number and updates. The user utilizes buttons across the top of the processing history in the application interface to sort accordingly. FIG. 3 illustrates sorting media processing history alphabetically based on job title because "Akeelah and the Bee" is followed by "Pocahontas" and "Underdog". If a user wants to display all jobs due in one week, the user can use the processing history to sort by job due date instead of manually searching all jobs or filter based on a specific window of time. When searching and sorting, the system 100 may include only completed jobs or both completed and incomplete jobs. Allowing a user to search and sort the processing history enables the user to more efficiently manage multiple media processing jobs.

Figure 8:
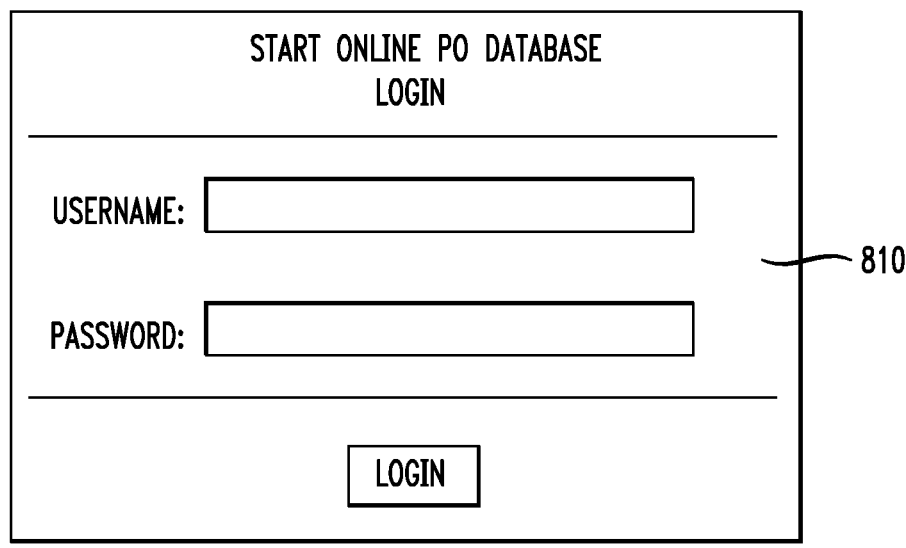
FIG. 8 illustrates an application interface for user authentication.
Figure 9:
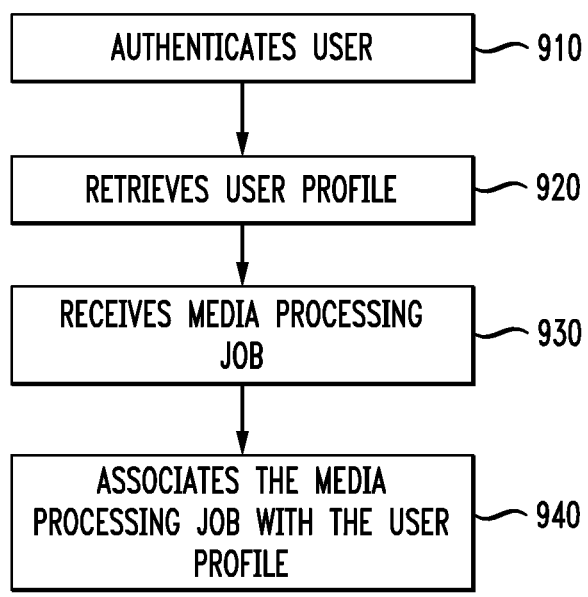
FIG. 9 illustrates an exemplary user authentication method embodiment.

Prior to entering a media processing job entry into the job submission table, the system 100 authenticates a user and receives the user profile associated with the user. FIG. 8 illustrates user authentication in the application interface and FIG. 9 illustrates user authentication. The system authenticates a user by validating a username and password 810 entered by the user through the application interface. Once the system authenticates the user (910), the system retrieves the user profile (920) stored on the system or elsewhere. The user profile can contain information specific to a user such as name, company, phone number, address, email address and user image. The system receives a media processing job (930) and associates the retrieved user profile with the user's job entries in the media job submission table (940).

Figure 10:
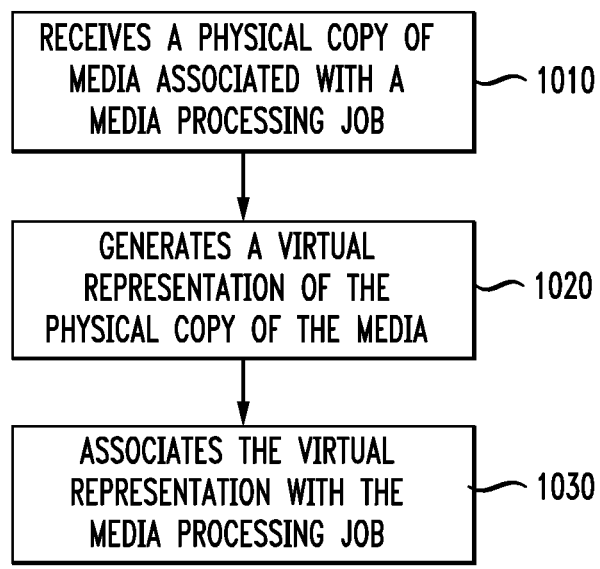
FIG. 10 illustrates an exemplary virtual representation of media method embodiment.

In another aspect, the system associates a physical copy of media with a media processing job to avoid confusion. This approach can be useful when, for example, a user submits a physical disk (such as a DVD) to be processed. Instead of relying on some indirect or unclear description of the physical disk in the online job history, the user can quickly glance at an image generated based on the physical disk to ensure that the appropriate physical disk was received and is being processed correctly. This approach can reduce confusion and clarify communications between the job submitter and any administrative staff involved in handling the job. FIG. 10 illustrates an example flow for associating a physical copy of media with a media processing job. In this example, the system receives a physical copy of media associated with a media processing job (1010). The system generates a virtual representation of the physical copy of the media (1020) and associates the virtual representation with the media processing job (1030). The virtual representation consists of an image, three-dimensional model or both of the physical copy of media. For example, a user mails or otherwise delivers a DVD containing video media for processing to a media processor. The media processing system generates a virtual representation of the actual received DVD, the physical copy of the media. The system generates a virtual representation using one or more images, a three-dimensional model or both. Then the system associates the virtual representation with the media processing job. Associating a virtual representation of media with a media processing job allows the user to verify that the system is processing the correct media. For example, a user may view an image of the DVD sent for processing and verify the handwriting on the DVD label. The system can generate different views of the DVD for different settings and output modalities, can generate a default view of the DVD, etc. The system can present the three-dimensional model in a user-manipulable format, so that the user can rotate the three-dimensional model around and view all sides and angles of the three-dimensional model.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method for tracking progress of media processing jobs, the method comprising:
   receiving a media processing job submitted by a user via an electronic portal;
   receiving a physical storage medium containing data associated with the media processing job;
   generating a three-dimensional virtual representation of the physical storage medium;
   associating the three-dimensional virtual representation with the media processing job;
   inserting the media processing job as a job entry in a job submission table;
   setting an initial status for the job entry;
   processing the media according to parameters associated with the media processing job;
   maintaining a processing history of the media processing job; and
   updating the initial status based on the processing.

2. The method of claim 1, further comprising:
   displaying at least part of the processing history in a report.

3. The method of claim 2, further comprising, in response to input from a viewer of the report, expanding the job entry to display additional information.

4. The method of claim 2, further comprising, in response to input from a viewer of the report, collapsing the job entry to display less information.

5. The method of claim 2, further comprising displaying at least one of headlines and notifications as a part of the report.

6. The method of claim 2, wherein a user downloads the report associated with a media job processing entry.

7. The method of claim 1, wherein the processing history comprises at least one of email correspondence between the user and a media processor, an email attachment, a modification to the media, a status update, and uploaded information.

8. The method of claim 1, wherein the processing history is sorted by at least one of job submission date, job title, job due date, processing order number, reference number and updates.

9. The method of claim 8, wherein the processing history is sorted using at least one of complete jobs and incomplete jobs.

10. The method of claim 1, further comprising:
    receiving a search query;
    searching the processing history based on the search query to produce search results; and
    displaying at least part of the search results.

11. The method of claim 1, wherein the electronic portal is a website.

12. The method of claim 1, further comprising, prior to receiving the job:
    authenticating the user; and
    retrieving a user profile associated with the user.

13. The method of claim 12, wherein the user profile comprises a user image.

14. The method of claim 12, further comprising linking the job entry to the user profile.

15. A system for generating a digital representation of a media processing job, the system comprising:
    a processor;
    a first module configured to control the processor to receive a physical storage medium containing data associated with an electronically submitted media processing job;
    a second module configured to control the processor to generate a three-dimensional virtual representation of the physical storage medium; and
    a third module configured to control the processor to associate the three-dimensional virtual representation with the electronically submitted media processing job.

16. The system of claim 15, wherein the three-dimensional virtual representation is added to a media processing job entry.

17. A non-transitory computer-readable storage medium storing instructions which, when executed by a computing device, cause the computing device to update a media processing job, the instructions comprising:
    receiving a media processing job submitted by a user via an electronic portal;
    receiving a physical storage medium containing data associated with the media processing job;
    generating a three-dimensional virtual representation of the physical storage medium;
    associating the three-dimensional virtual representation with the media processing job;
    processing the media according to parameters associated with the media processing job;
    maintaining a processing history of the media processing job;
    identifying email correspondence associated with the media processing job; and
    incorporating at least part of the email correspondence in the processing history.

18. The non-transitory computer-readable storage medium of claim 17, the instructions further comprising incorporating an email attachment associated with the email correspondence in the processing history.

* * * * *